UNITED STATES PATENT OFFICE.

WILLIAM PRIOR AND WILLIAM LEONARD PRIOR, OF KENT, AND JAMES SIVEWRIGHT GIBSON, OF LONDON, ENGLAND, ASSIGNORS TO THE HOLLOW STRUCTURE AND AIRCRAFT COMPANY LIMITED, OF LONDON, ENGLAND.

MANUFACTURE OF HOLLOW ARTICLES FROM WOOD LAMINÆ.

1,355,778.      Specification of Letters Patent.     Patented Oct. 12, 1920.

No Drawing.     Application filed March 13, 1918. Serial No. 222,222.

*To all whom it may concern:*

Be it known that we, WILLIAM PRIOR and WILLIAM LEONARD PRIOR, subjects of the King of Great Britain and Ireland, both residing at 215 Upper Grosvenor road, Tunbridge Wells, Kent, England, and JAMES SIVEWRIGHT GIBSON, a subject of the King of Great Britain and Ireland, residing at 5 Old Bond street, London, England, have invented new and useful Improvements in the Manufacture of Hollow Articles from Wood Laminæ, of which the following is a specification.

This invention relates to the manufacture of hollow articles, such as tubes, spars, poles, and the like, and consists in the employment, in a particular manner, of a number of thin sheets of wood, commonly called veneers, glued or otherwise joined together face to face.

In carrying out our improved process of manufacture, we employ strips or bands of wood veneer, treated in the usual manner to facilitate bending, in conjunction with a mandrel which may be of circular or other form in cross section according to the shape of the tube, spar, pole or the like, to be produced. To the mandrel is applied a covering of wood veneer so arranged that the general direction of its fiber is parallel to the axis of the mandrel. About this covering is spirally wound a strip of veneer whereof the fiber is longitudinal with the strip and therefore, when laid up spirally, oblique to that of the primary covering. About this spiral winding is imposed another covering whereof the fiber is arranged longitudinally. This is followed by another spiral winding of veneer; but in this case, the fiber is arranged in a direction diagonally opposite to that of the previous spiral winding. This second winding is, like the first, followed by a covering of veneer whereof the fiber is arranged longitudinally; that is to say, parallel with the axis of the mandrel. A tube or other body may in this manner be built up to afford any thickness of substance desired; the spirally wound layers, with their fiber or grain arranged alternately in diagonally opposite directions, respectively alternating with layers of veneer having their fiber or grain disposed longitudinally.

For the production of taper tubes for masts, spars, telegraph poles and the like, the coverings and spiral strips before referred to may be laid up on taper or otherwise shaped mandrels, the strips being cut taper or otherwise to correspond.

We are aware that, in the manufacture of wooden tubes, it has been proposed to employ veneers with their grain arranged longitudinally in conjunction with strips of veneer laid up spirally and we advance no broad claim thereto; our invention being restricted to a specific construction which presents certain advantages not yielded by other multi-ply structures of the same general character.

We claim:—

The manufacture of hollow articles, such as tubes, spars, poles and the like, consisting in strips of wood veneer spirally wound in opposite directions in conjunction with coverings of veneer whereof the fiber is arranged longitudinally, the latter being disposed inside, outside and between, the spiral windings and the several laminæ constituting the structure glued or otherwise fastened together face to face, substantially as herein described.

WILLIAM PRIOR.
WILLIAM LEONARD PRIOR.
JAMES SIVEWRIGHT GIBSON.